United States Patent [19]

Lee

[11] Patent Number: 5,712,472
[45] Date of Patent: Jan. 27, 1998

US005712472A

[54] CARD READ/WRITE METHOD

[75] Inventor: Sung-cheoul Lee, Uijeongbu, Rep. of Korea

[73] Assignee: Samsung Electronics Co., Ltd., Suwon, Rep. of Korea

[21] Appl. No.: 599,877

[22] Filed: Feb. 12, 1996

[30] Foreign Application Priority Data

Feb. 25, 1995 [KR] Rep. of Korea .......... 95-3766

[51] Int. Cl.⁶ .................................................. G06K 7/00
[52] U.S. Cl. .......................... 235/486; 235/380; 235/487; 235/492
[58] Field of Search .................................. 235/486, 487, 235/492, 380

[56] References Cited

U.S. PATENT DOCUMENTS

| | | |
|---|---|---|
| 4,683,372 | 7/1987 | Matsumoto . |
| 4,697,073 | 9/1987 | Hara . |
| 4,709,137 | 11/1987 | Yoshida . |
| 4,727,244 | 2/1988 | Nakano et al. . |
| 4,961,142 | 10/1990 | Elliott et al. . |
| 5,036,461 | 7/1991 | Elliott et al. . |
| 5,367,150 | 11/1994 | Kitta et al. . |
| 5,500,517 | 3/1996 | Cagliostro ............... 235/486 |
| 5,563,400 | 10/1996 | Le Roux ................. 235/486 |

FOREIGN PATENT DOCUMENTS

| | | |
|---|---|---|
| WO 93000658 | 1/1993 | European Pat. Off. . |
| 14192 | 1/1991 | Japan . |

*Primary Examiner*—Harold Pitts
*Attorney, Agent, or Firm*—Robert E. Bushnell, Esq.

[57] ABSTRACT

A novel card read and write process for use in a single card read and write device constructed in a data processing terminal for enabling the card read and write device to access both types of IC card including a smart card and a memory card in a cost-efficient manner. The process requires the single card read and write device to determine whether the type of card inserted into a card insertion slot of the data processing terminal is one of the smart card and the memory card by detection of an answer-to-reset (ATR) signal in order to perform read and write operations in accordance with the type of IC card determined.

20 Claims, 3 Drawing Sheets

5,712,472

1

CARD READ/WRITE METHOD

CROSS-REFERENCE TO RELATED APPLICATION

This application makes reference to, incorporates the same herein, and claims all benefits accruing under 35 U.S.C. §119 from an application for *Card Read/Write Method* earlier filed in the Korean Industrial Property Office on 25 Feb. 1995 and there assigned Ser. No. 3766/1995.

BACKGROUND OF THE INVENTION

1. Technical Field

The present invention relates to a card read and write process for a data processing terminal, and more particularly, to a card read and write method of a data processing terminal capable of reading and writing information on different types of IC card including a smart card and a memory card, with a single card read and write device.

2. Background Art

Generally, an IC card such as those proposed, for example, in U.S. Pat. No. 4,683,372 for *IC Card System* issued to Matsumoto, U.S. Pat. No. 4,697,073 for *IC Card* issued to Hara, U.S. Pat. No. 4,697,073 for *IC Card And Financial Transaction Processing System Using IC Card* issued to Yoshida, and U.S. Pat. No. 4,727,244 for *IC Card System* issued to Nakano et al., is a conventional plastic card containing an integrated circuit installed in the plastic card and having a liquid crystal display section and battery installed on one side for enabling the user to inquire and provide a visual display of the transaction contents of the card's memory. Such an IC card also contains a read only memory (i.e., a ROM), a random access memory (i.e., a RAM), a central processing unit (i.e., microcomputer), a plurality of connectors (usually eight contacts) connecting to a terminal in accordance with ISO standards (International Standardization Organization) for supplying power and enabling data processing, and a nonvolatile memory capable of storing transaction information such as, for example, the name of the financial institution, the account number of the customer, the address, an account balance and a secret password.

Conventional IC cards may be generally classified as being one of two different types. The first type is an active-type known as a "smart" card which is provided with a microcomputer and a memory, while the second type is a passive-type containing a memory but no a microcomputer and is known simply as a "memory" card. Typically, the physical shape, dimensions and connection terminals of both types of IC card, whether such an IC card is a "smart" card or a "memory" card, are essentially the same; that is, the memory card also has similar connectors connecting to a data processing terminal as that contained in the smart card. As described above, the difference between the smart card and the memory card is that the memory card does not contain therein a microcomputer which allows the user to interact with information stored in its memory. The signal transmission and signal processing of the two types of IC card are different. That is, I have found that in order for a transaction terminal to provide access to a memory card and a smart card, separate card read and write devices exclusively used for each of the memory card and the smart card must be constructed to access the respective memory card and the smart card independently and individually. Thus, in order for the conventional transaction terminal to accommodate both the smart card and the memory card such as that disclosed, for example, in U.S. Pat. No. 4,961,142 for

2

*Multi-Issuer Transaction Device With Individual Identification Verification Plug-In Application Modules For Each Issuer* issued to Elliott et al., U.S. Pat. No. 5,036,461 for *Two-Way Authentication System Between User's Smart Card And Issuer-Specific Plug-In Application Modules In Multi-Issued Transaction Device* issued to Elliott et al., and U.S. Pat. No. 5,367,150 for *Data Processing System Using IC Card* issued to Kitta et al., separate read and write cards for each of the smart card and the memory card must be installed inside the transaction terminal. For example, in the two Elliott et al. references, U.S. Pat. Nos. 4,961,142 and 5,036,461, and Kitta et al., U.S. Pat. No. 5,367,150, separate IC card read and write device and a conventional memory card reader and connector are constructed internally of the transaction terminal in order to operate in connection with the smart card and the memory card. This construction, as I have observed, is unnecessarily burdensome and ineffective. Accordingly, further improvements can be contemplated.

SUMMARY OF THE INVENTION

It is therefore an object of the present invention to provide an improved device and process for reading and writing data to wallet sized cards containing a memory.

It is another object to provide an IC card read and write method for simply and efficiently performing read and write operations for both types of IC cards including a smart card and a memory card.

It is also an object of the present invention to provide a novel IC card read and write technique used in conjunction with a transaction terminal constructed with a single card read and write device for performing read and write operations for both types of IC cards including a smart card and a memory card.

To achieve these and other objects, the present invention contemplates a data processing system for use in conjunction with a smart card and a memory card. The data processing system uses a card terminal having a card insertion slot adapted to receive the smart card and the memory card, and a single card read and write device for determining whether a card inserted into the card insertion slot is one of the smart card and the memory card in order to perform read and write operations. The card read and write device determines that the IC card inserted into the card insertion slot is a smart card when an answer-to-reset (ATR) signal stored in the card is present upon initialization of the card inserted, and alternatively, determines that the IC card inserted into the card insertion slot is a memory card when the answer-to-reset (ATR) signal is absent upon initialization of the IC card inserted.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
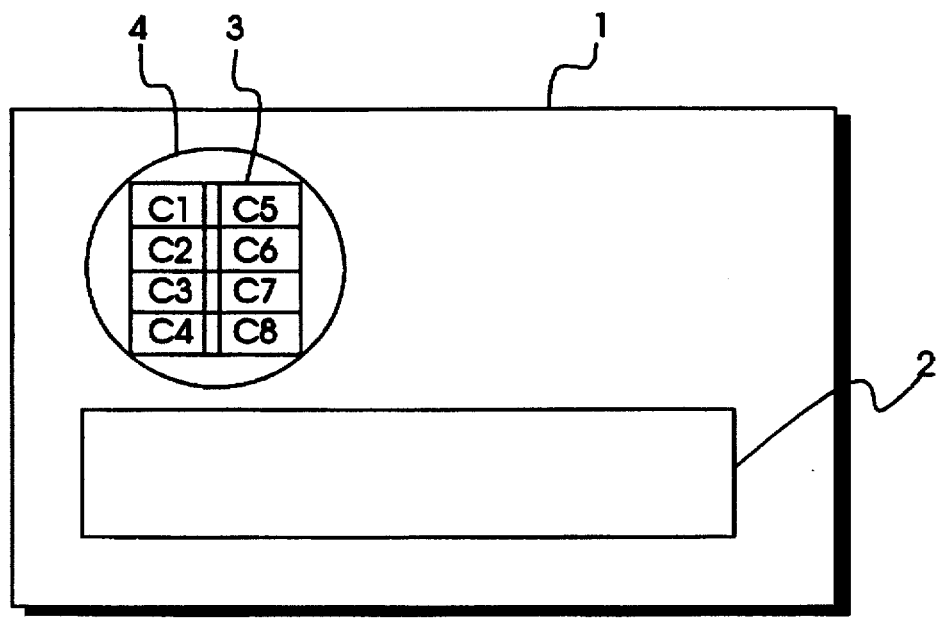
FIG. 1 is a block diagram of a contact-type IC card having ISO-7816 standard surface connections.

Referring now to the drawings and particularly to FIG. 1, which illustrates an IC card of an ISO-7816 standard used in conjunction with a single card read and write device constructed in a data processing terminal according to the principles of the present invention. In this figure, the IC 4 is buried inside an IC card 1. On the upper surface of the IC card 1, eight connectors 3 (C1 to C8) are formed and exposed to the card exterior. These eight connectors 3 (C1 to C8) are connected to the card read and write device provided in the data processing terminal, when the IC card 1 is inserted into the terminal. In addition, an embossment 2 is formed on the front surface of the card, and on the back, magnetic stripe (not shown) is formed to be used as a spare storage medium.

Figure 2:
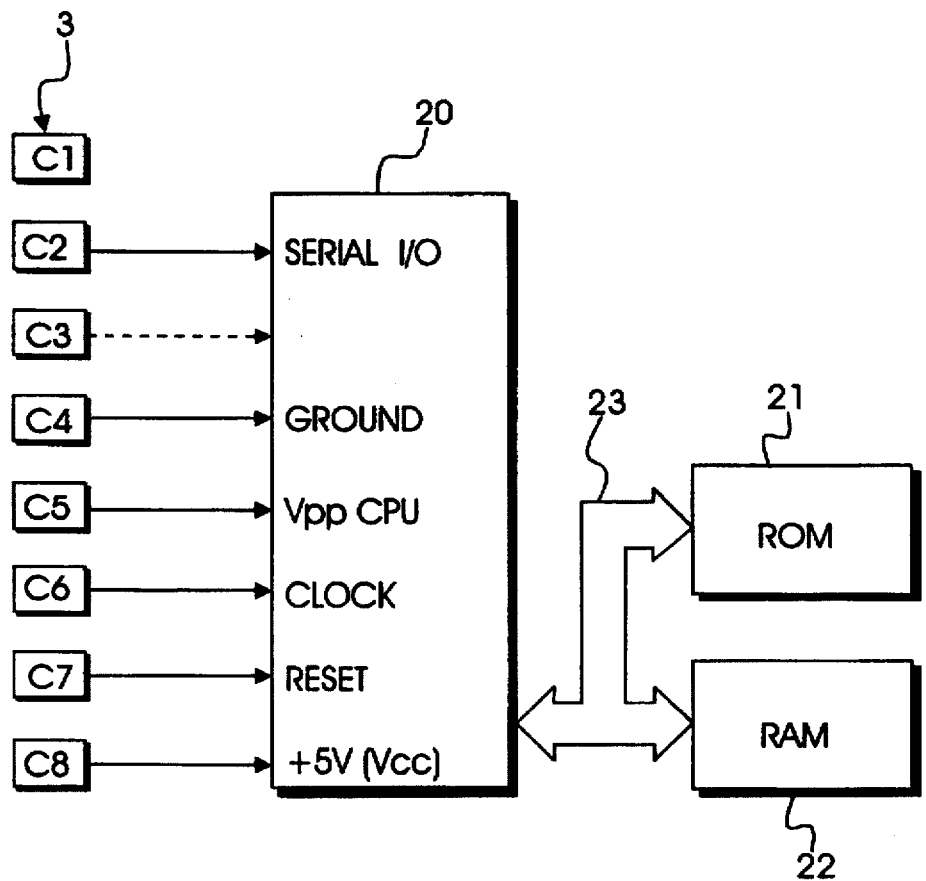
FIG. 2 is a block diagram showing an electrical structure of an IC card provided with a microcomputer known as a smart card constructed according to the principles of the present invention.

FIG. 2 is a block diagram of the IC 4 of the IC card 1 provided with a microcomputer known as a "smart" card. The IC 4 is composed of CPU 20, EEP ROM 21 for storing operating program to perform electrical writing and erasing, when the IC card 1 is inserted into the card read and write device, and RAM 22 for working storage. The connector 3 is formed of eight conductors C1 through C8 of which C1 represents a supply voltage (Vcc) input terminal, C2 represents a reset (RST) signal input terminal, C3 represents a clock (CLK) signal input terminal, C5 represents a ground terminal, C6 represents an EEPROM drive voltage (Vpp) input terminal, C7 represents a data input/output (I/O) terminal, and C4 and C8 represent reserved terminals. As shown in FIG. 2, when the IC card 1 is in use, electric power (0V, +5V) is supplied to the CPU 20 by way of the terminals C4 and C8 when the IC card 1 is inserted into the card read and write device. A reset pulse and a clock signal are also supplied to the CPU 20 through the connector C7 and connector C6. Serial data exchange between the CPU 20 and the card read and write device is performed through the connector C2. The remaining connectors C1 and C3 are extra contacts. In addition, the CPU 20, the ROM 21 and RAM 22 are interconnected through a data bus 23 so that the CPU 20 can control operations of each constituent element.

Figure 3:
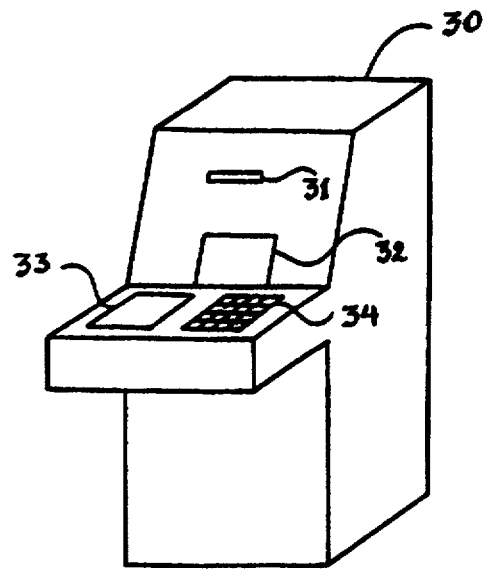
FIG. 3 is a perspective view of a data processing terminal for use with both types of IC card including a smart card and a memory card, in accordance with the principles of the present invention.

FIG. 3 is a perspective view of a data processing terminal 30 connected to a central or host computer for use with both types of IC card including a smart card and a memory card according to the principles of the present invention. The data processing terminal 30 typically comprises a card insertion slot 31 which includes a card read and write device, for accommodating insertion of an IC card including a smart card and a memory card in order to perform data processing or transaction; a paper discharging opening 32 for presenting to the user the necessary transaction receipt; a display 33 for providing the user with operational procedure; and a keyboard 34 which includes numeric keys and control keys, for allowing the user to enter a number corresponding to, for example, a desired transactional account, a secret number and a claimed amount. In addition, the data processing terminal 30 also contains internal central processing unit (not shown) and memory devices (not shown) storing different application programs for facilitating the transactions made with two different types of IC card including a smart card or a memory card.

Figure 4:
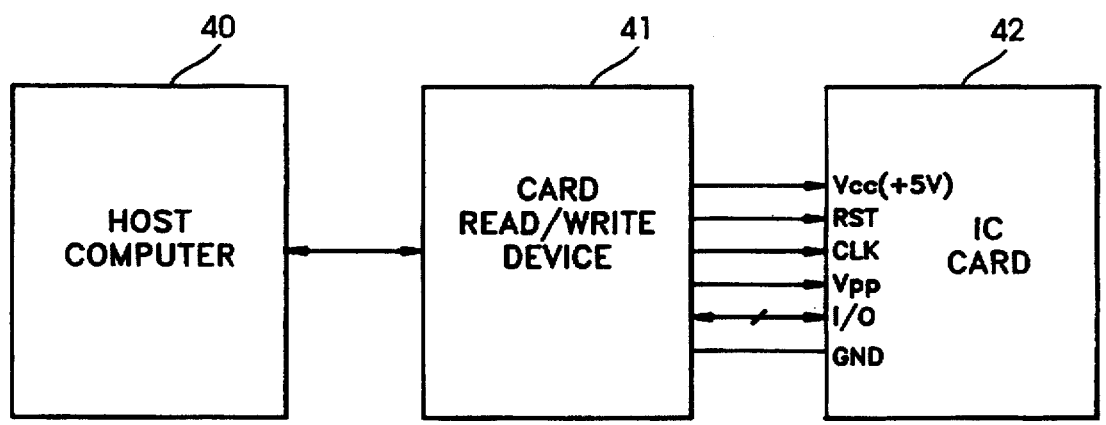
FIG. 4 is a block diagram showing how a single card read and write device constructed in the data processing terminal accommodates the type of card inserted into the terminal for conducting read and write operations according to the principles of the present invention.

FIG. 4 illustrates a single card read and write device 41 constructed in the data processing terminal connected to a host computer 40 for identifying the type of card inserted into the terminal i.e., whether an inserted IC card is a smart card or a memory card, in order to conduct read and write operations according to the type of IC card identified. Referring to FIG. 4, when an IC card 42 is inserted into the card insertion slot of the data processing terminal 30 of FIG. 3, and the IC card 42 is properly connected to the card read and write device 41, the card read and write device 41 transmits a predetermined initializing signal to the IC card 4 in order to set the serial input/output terminal to high level, reset terminal from low to high level, the Vcc and Vpp terminals each to 5 Volts, and to supply a clock to the IC card 42 by way of the corresponding terminals, I/O, Reset, Vpp, Vcc and clock terminals. Once the IC card 42 is initialized, and if the inserted IC card is a smart card having a microcomputer installed therein, the microcomputer reads out an answer-to-reset (ATR) signal already stored in its internal ROM as shown in FIG. 2, and sends this answer-to-reset (ATR) signal to the card read and write device 41 via the I/O terminal in order for the card read and write device 41 to select an application program or "file" stored in the data processing terminal corresponding to the IC card to begin performing read and write operations.

If, on the other hand, the microcomputer installed in the inserted card does not read out the answer-to-reset (ATR) signal, and therefore, does not send the answer-to-reset (ATR) signal to the card read and write device 41, the card read and write device 41 determines that the inserted IC card is not a smart card, but rather is simply a memory card; that is, an IC card without a micromputer installed in the plastic body. On the basis of this determination, the card read and write device 41 selects an application program or "file" stored in the data processing terminal corresponding to the memory card, in order to begin performing read and write operations in accordance with the selected application program. As seen from the foregoing arrangements of the invention, there is no need for the conventional data processing terminal to contain separately constructed card read and write devices for each of the smart card and the memory card for use with both types of IC card. The data processing terminal as constructed according to the principles of the present invention only requires a single card read and write device for identifying the type of IC card inserted i.e., whether the inserted IC card is a smart card or a memory card by way of an answer-to-reset (ATR) signal, and for performing read and write operations in accordance with the type of IC card identified.

Figure 5:
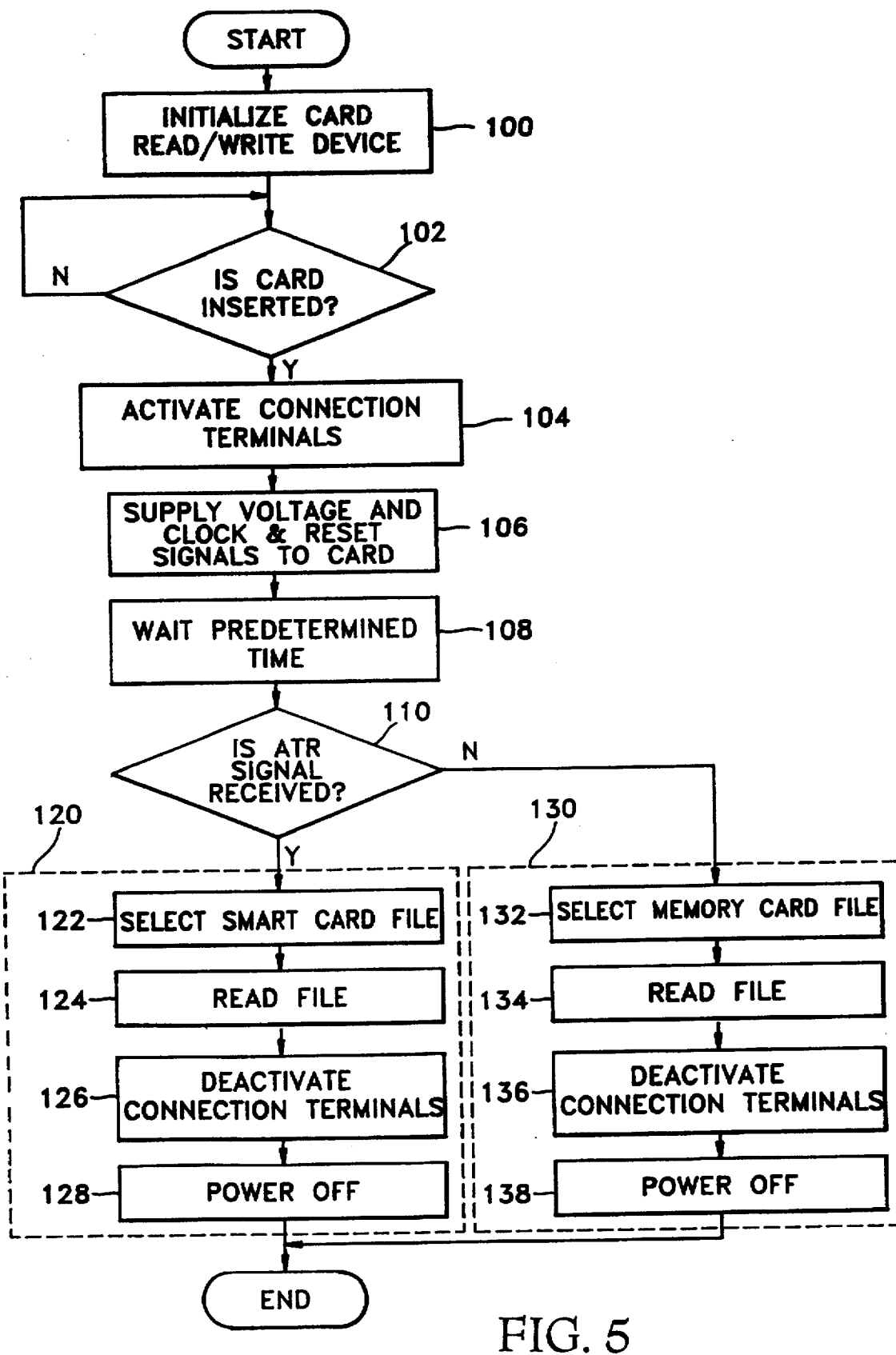
FIG. 5 is a flow chart explaining a process in which a single card read and write device identifies the type of card inserted into the data processing terminal and conducts the read and write operations according to the principles of the present invention.

FIG. 5 is a flow chart explaining a process in which a single card read and write device identifies the type of card inserted into the data processing terminal and conducts the read and write operations as described with reference to FIG. 4. According to the operation of a main program performing the read and write operations in accordance with the type of IC card inserted, the card read and write device 41 is initialized by the host computer 40 at step 100. Upon initialization, a communication state of the card read and write device 41 is checked and the current time is displayed. After step 100, the card read and write device 41 checks whether a card is inserted into the card insertion slot at step 102. If no card has been inserted into the card insertion slot, the card read and write device 41 continues to monitor for such insertion. If an IC card has been inserted into the card insertion slot however, whether such card is one of a smart card or a memory card, the card read and write device 41 executes a routine for reading the card as follows.

Upon execution of the routine, the card read and write device 41 activates all connection terminals such as, the I/O, Reset, Vpp, Vcc and clock terminals of the card at step 104, and supplies the supply voltage, the clock signal, the reset signal to the corresponding terminals of the card at step 106. Once the inserted IC card (whether such inserted IC card is one of a smart card and a memory card) is properly connected, the card read and write device 41 waits for a predetermined time to receive an answer-to-reset (ATR) signal from the card at step 108. If a predetermined carry is set, that is, when the card read and write device 41 receives the answer-to-reset (ATR) signal from the inserted card at step 110, the card read and write device 41 determines that the inserted card is a smart card, and executes accordingly a routine 120 selected in correspondence with the smart card for reading the smart card. Once the card read and write device 41 accesses the application program for use in conjunction with the smart card, the desired file of the smart card is selected at step 122, the selected file is the read out at step 124, the connection terminals of the smart card are deactivated at step 126, the power source is shut down at step 128, and then the program terminates.

If, on the other hand, the predetermined carry is not set, that is, when the card read and write device 41 does not receive the answer-to-reset (ATR) signal at step 110, the card read and write device 41 determines that the inserted card is not a smart card, but is merely a memory card in order to execute accordingly a routine 130 selected in correspondence with the memory card for reading the memory card. Once the card read and write device 41 accesses the application program for use in conjunction with the memory card, the desired file of the memory card is selected at step 132, the selected file is the read out at step 134, the connection terminals of the memory card are deactivated at step 136, the power supply is shut down at step 134, and then the program terminates.

As seen from the foregoing, since it is possible to perform read and write operations with two different types of IC card including a "smart" card and a "memory" card simply on the basis of an answer-to-reset (ATR) signal, a single card read and write device utilizing the above technique can advantageously be used to read and write two different types of IC card in a most convenient and cost-efficient manner.

While there have been illustrated and described what are considered to be preferred embodiments of the present invention, it will be understood by those skilled in the art that various changes and modifications may be made, and equivalents may be substituted for elements thereof without departing from the true scope of the present invention. For example, the data terminal can also be constructed to accommodate and receive other types of card such as a conventional magnetic strip, non-IC card. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A data processing system for use in conjunction with a smart card and a memory card, comprising:

a central computer for performing data processing; and a card terminal connected to said central computer through a communication line, said card terminal comprising a card insertion slot adapted to receive each of the smart card and the memory card, a single card read and write device for making a determination of whether a card inserted into the card insertion slot is one of the smart card and the memory card and enabling read and write operations of the card inserted in dependence upon said determination, said single card read and write device determining that the card inserted into the card insertion slot is the smart card when an answer-to-reset signal is present upon initialization of the card inserted, and determining that the card inserted into the card insertion slot is the memory card when the answer-to-reset signal is absent upon initialization of the card inserted.

2. The data processing system of claim 1, wherein said card terminal further includes means for storing application programs for enabling said single card read and write device to conduct data processing of each of the smart card and the memory card in dependence upon said determination.

3. The data processing system of claim 2, wherein said smart card contains a microprocessor, a plurality of connection terminals, and a read-only-memory for responding to said card read and write device with said answer-to-reset signal and operating program to perform electrical writing and erasing, when the card inserted into the card insertion slot is connected to the card read and write device via said plurality of connection terminals.

4. The data processing system of claim 3, wherein said memory card contains a plurality of connection terminals, and a read-only-memory for responding to said card read and write device and operating program to perform electrical writing and erasing, when the card inserted into the card insertion slot is connected to the card read and write device via said plurality of connection terminals.

5. The data processing system of claim 4, wherein said single read and write device determines whether the card inserted into the card insertion slot is one of the smart card and the memory card by activating the connection terminals, supplying a power voltage, clock and reset signals to the corresponding connection terminals, waiting for a predetermined time period for reception of said answer-to-reset signal.

6. The data processing system of claim 5, further comprised of said single read and write device determining that the card inserted into the card insertion slot is the smart card upon receipt of said answer-to-reset signal during said predetermined time period, and determining that the card inserted is the memory card when said single read and write device does not receive said answer-to-reset signal during said predetermined time period.

7. The data processing system of claim 1, further comprised of said single read and write device determining that the card inserted into the card insertion slot is the smart card upon receipt of said answer-to-reset signal during a predetermined time period, and determining that the card inserted is the memory card when said single read and write device does not receive said answer-to-reset signal during said predetermined time period.

8. A method for a card terminal having a card read and write device for performing read and write operations of an IC card, said method comprising the steps of:

checking whether a card is inserted into the card terminal;

when the card is inserted into the card terminal, electrically connecting the card and the card terminal;

applying an initializing signal to the card from the card terminal upon the completion of said electrical connection between the card and the card terminal;

waiting for a predetermined time period to receive an answer-to-reset signal from the card;

when the answer-to-reset signal is received from the card inserted into the card terminal within said predetermined time period, determining that the card inserted into the card terminal is a smart card and enabling the card read and write device to conduct transactions with the smart card; and alternatively, when the answer-to-reset signal is not received from the card inserted into the card terminal within said predetermined time period, determining that the card inserted into the card terminal is a memory card and enabling the card read and write device to conduct transactions with the memory card.

9. The method of claim 8, further comprising selection of application programs for use with the smart card for enabling the card read and write device to perform read and write operations on the smart card, when the answer-to-reset signal is received from the card inserted into the card terminal within said predetermined time period.

10. The method of claim 8, further comprising selection of application programs for use with the memory card for enabling the card read and write device to perform read and write operations on the memory card, when the answer-to-reset signal is not received from the card inserted into the card terminal within said predetermined time period.

11. The method of claim 8, wherein said smart card contains a microprocessor, a plurality of connection terminals, and a read-only-memory for responding to said card read and write device with the answer-to-reset signal and operating program to perform electrical writing and erasing, when the card inserted into the card insertion slot is connected to said card read and write device via said plurality of connection terminals.

12. The method of claim 11, wherein said memory card contains a plurality of connection terminals, and a read-only-memory for responding to said card read and write device and operating program to perform electrical writing and erasing, when the card inserted into the card insertion slot is connected to the card read and write device via said plurality of connection terminals.

13. A data processing terminal for use in conjunction with a smart card and a memory card, comprising:

a card insertion slot adapted to receive each of the smart card and the memory card;

display means for providing a user a visual display of an operational procedure;

input means for allowing the user to conduct transactions with one of the smart card and the memory card; and a single card read and write device for determining an identity of a card inserted into the card insertion slot and for enabling read and write operations in dependence upon said identity, said card read and write device determining that the card inserted into the card insertion slot corresponds the smart card when an answer-to-reset signal is received within a predetermined time period upon initialization of the card inserted, and alternatively determining that the card inserted into the card insertion slot corresponds to the memory card when the answer-to-reset signal is not received within said predetermined time period upon initialization of the card inserted.

14. The data processing terminal of claim 13, further includes means for storing application programs for enabling said single card read and write device to conduct data processing of each of the smart card and the memory card in dependence upon said identity.

15. The data processing terminal of claim 13, wherein said smart card contains a microprocessor, a plurality of connection terminals, and a read-only-memory for responding to said card read and write device with said answer-to-reset signal and operating program to perform electrical writing and erasing, when the card inserted into the card insertion slot is connected to said card read and write device via said plurality of connection terminals.

16. The data processing terminal of claim 15, wherein said memory card contains a plurality of connection terminals, and a read-only-memory for responding to said card read and write device and operating program to perform electrical writing and erasing, when the card inserted into the card insertion slot is connected to said card read and write device via said plurality of connection terminals.

17. The data processing terminal of claim 15, wherein said single read and write device determines the identity of the card inserted into the card insertion slot as one of the smart card and the memory card by activating the connection terminals, supplying a power voltage, clock and reset signals to the corresponding connection terminals, waiting for a predetermined time period for reception of said answer-to-reset signal.

18. A read and write method for a card terminal having a card read and write device for reading and writing information on an information card, said read and write method comprising the steps of:

initializing the card read and write device;

checking whether an information card is inserted into the card read and write device of the card terminal after initialization of the card read and write device;

when the information card is inserted into the card read and write device, electrically connecting the card and the card read and write device;

applying an initializing signal to the inserted information card from the card terminal upon the completion of said electrical connection between the inserted information card and the card read and write device;

waiting for a predetermined time period to receive an answer-to-reset signal generated from the inserted information card;

determining that the inserted information card is a card of a first type and enabling the card read and write device to conduct transactions in accordance with the card of said first type, when the answer-to-reset signal is received from the inserted information card within said predetermined time period; and determining that the inserted information card is a card of a second type and enabling the card read and write device to conduct transactions in accordance with the card of said second type, when the answer-to-reset signal is not received from the inserted information card within said predetermined time period.

19. The read and write method of claim 18, further comprised of the card of said first type corresponding a smart card, comprising selection of application programs for enabling the card read and write device to perform read and write operations on the smart card, when the answer-to-reset signal is received from the inserted information card within said predetermined time period.

20. The read and write method of claim 18, further comprised of the card of said second type corresponding a memory card, and comprising selection of application programs for enabling the card read and write device to perform read and write operations on the memory card, when the answer-to-reset signal is not received from the inserted information card within said predetermined time period.

* * * * *